United States Patent [19]

Roger

[11] 4,258,741
[45] Mar. 31, 1981

[54] ADJUSTABLE PRESSURE SENSING PISTON MECHANISM

[75] Inventor: Harry Roger, Lafayette, La.

[73] Assignee: J. Edwin Roy, Lafayette, La.; a part interest

[21] Appl. No.: 63,081

[22] Filed: Aug. 2, 1979

[51] Int. Cl.³ ............................................. F16K 31/122
[52] U.S. Cl. ...................................... 137/270; 92/59; 92/62
[58] Field of Search ................... 137/270, 269; 92/59, 92/62, 63; 91/173, 54

[56] References Cited

U.S. PATENT DOCUMENTS 3,491,785 1/1970 Kay ..................................... 92/62 X

Primary Examiner—Alan Cohan
Attorney, Agent, or Firm—Guy E. Matthews

[57] ABSTRACT

A piston mechanism for sensing a control fluid pressure and shifting a valve element in response thereto. The piston mechanism comprises a first piston having an internal bore in which is positioned a second piston. Varying ranges of fluid pressure sufficient to actuate the piston mechanism are accomplished by positioning the piston mechanism within its piston chamber in varying orientations so that the effective piston surface area exposed to a control fluid is dictated by the specific orientation of the piston mechanism within the chamber. In one orientation, the effective fluid pressure surface area is that of the larger piston member. In a second orientation, the effective surface area exposed to the sensing fluid is a first surface of the smaller piston carried by the larger piston. In a third orientation, the effective surface area exposed to the sensing fluid is that of the opposite end of the second piston. To effect these various orientations of the piston mechanism, the piston orientation is reversed and O-rings relocated about the pistons, and in one orientation, a spacer is provided to cause the two pistons to shift simultaneously. In this manner, varying ranges of sensing fluid pressure sufficient to shift a pilot valve or other valve is accomplished with the use of a single spring within the valve to urge the valve element into position against the action of the sensing fluid pressure force.

12 Claims, 3 Drawing Figures

ADJUSTABLE PRESSURE SENSING PISTON MECHANISM

FIELD OF THE INVENTION

This invention relates to an improvement in high-low pressure sensing pilot valves of the block and bleed type adapted to control the operation of motor valves and the like responsive to a control fluid pressure.

BACKGROUND OF THE INVENTION

Pilot valves of the block and bleed type commonly use a pressure balance spool valve which is shiftable, responsive to a change in a controlled, sensed pressure to apply or exhaust a control pressure to a motor valve, thereby controlling the latter. Thus the valve element is normally urged to one position by a spring whose force is opposed by the fluid pressure to be controlled acting on a piston to urge the valve element toward a second position. Pressure sensing valves of this type generally incorporate as part of the valve element, or separate from the valve element and engaging the valve element, a piston surface within a piston chamber and exposed to the sensing fluid pressure so that the area of the piston member determines the force at which a specified pressure will overcome the spring force opposing the fluid pressure to urge the valve element toward its second position. For a specified piston area pressure surface and a specified spring, a pressure sensor pilot valve has a specified range of pressure to which the "trip" pressure may be adjusted. In order to accommodate different values of pressure ranges, pilot valves incorporated the use of a number of springs of varying compression force and/or different piston and housing assemblies having varying piston surface areas. This practice necessitated interchanging these various springs and/or piston and housing assemblies to accommodate a certain specific range of "trip" pressure in order for the sensing pilot valve to function properly.

SUMMARY OF THE INVENTION

The present invention is directed toward a piston mechanism for use with a valve having a movable valve element therein. The piston mechanism comprises first and second piston members adapted to be positioned within a piston chamber in different orientations so that different piston surface areas are exposed to a sensing fluid pressure to effect different ranges of sensing fluid pressure sufficient to urge the piston mechanism against the valve element to shift the element from one position to another. The piston mechanism is reversable within the chamber so that, in different orientations of the piston mechanism within the chamber, opposite piston surface areas are exposed to the sensing fluid to determine the ranges of fluid pressure at which the valve element will shift.

It is an object of the present invention to provide a device for use with a valve having an operable valve element therein, such device having an internal pressure sensing piston means which is reversable within its piston chamber in order to provide different effective piston surface areas exposed to a sensing pressure port, thereby providing different ranges of sensing pressure to "trip" the valve, the valve utilizing only a single compression spring in opposition to the sensing fluid pressure.

DETAILED DESCRIPTION OF THE INVENTION

Figure 1:
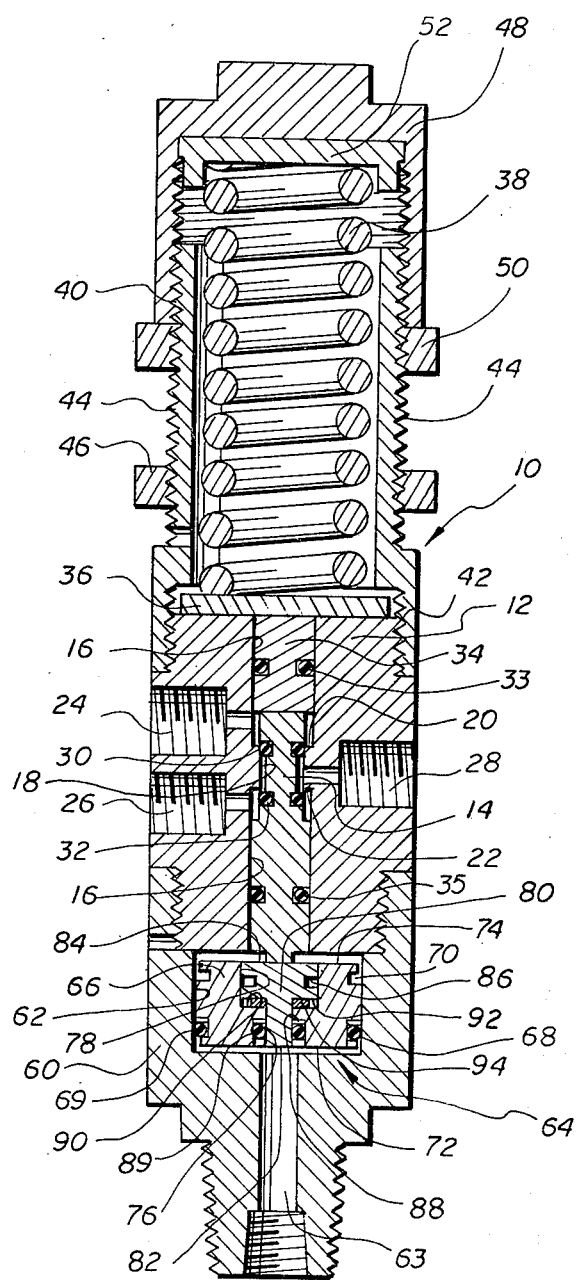
FIG. 1 is a vertical sectional view of a high-low pilot valve incorporating the present invention.

Turning now to the drawings, and more specificly to FIG. 1, a high-low pressure sensing pilot valve is shown generally illustrated by the numeral 10. The valve comprises a valve body 12 having an elongated bore 16 therethrough in which is positioned a valve element 14 operable to shift (vertically in the drawing) between two positions. The valve body 12 includes an intermediate bore 18 defining an upper annular surface 20 and lower annular surface 22, which annular surfaces are engaged by respective first and second O-rings 30 and 32 in order to provide a seal between the valve element 14 and intermediate bore 18 when the valve element is in either of its two positions. The valve body 12 includes first inlet port 24 communicating with the elongated bore 16 at a position above the intermediate bore 18, a second inlet port 26 communicating with the elongated bore at a position below the intermediate bore and an outlet port 28 communicating with the elongated bore at the location of the intermediate bore.

As best shown in FIG. 1, when the valve element 14 is in its "lower" position, the first or upper O-ring 30 engages the upper annular surface 20 to effect a seal therebetween, precluding communication between the first inlet port 24 and the outlet port 28. Similarly, when the valve element 14 is in its upper position, the second, or lower O-ring 32 engages the lower annular surface 22 to effect a seal therebetween, precluding communication between the second inlet port 26 and the outlet port 28. In each of the above instances, when communication is precluded between an inlet port and the outlet port, the valve element 14 is so positioned to permit communication between the other inlet port and the outlet port. Thus, with the valve element 14 in its upper position it "blocks" communication between the second inlet port 26 and the outlet port 28 as it "bleeds" any residual fluid pressure from the outlet port to the first inlet port. Similarly, with the valve element 14 in its lower position, it blocks communication between the first inlet port and the outlet port while it permits communication between the second inlet port 26 and outlet port in order to bleed any residual fluid pressure therein.

Fluid pressure within the area of the intermediate bore 18 is precluded from escaping from either end of the elongated bore 16 by operation of respective upper and lower O-rings 33 and 35. It can be appreciated that it would be impossible to install a valve element 14 of the particular design shown in the drawings within the elongated bore 16 and the intermediate bore 18 of the valve body 12. Therefore, the valve element 14 includes a separate elongated member 34 which is installed from above as the main valve element portion is installed from below. This elongated member 34 engages a pressure plate 36 positioned immediately above the valve body 12, which pressure plate in turn engages a compression spring 38 for providing a force urging the elongated member and valve element 14 downwardly toward its second position as shown in FIG. 1. The spring 38 is retained in compression by a spring housing 40 which is threadedly engaged to the valve body at 42. The spring housing 40 includes external threads 44 threadedly engaging an adjusting screw 48 at the upper end thereof for adjusting the compression force of the spring 38 against the pressure plate 36. The spring 38 is retained in axial alignment with the pressure plate 36 and adjusting screw 48 by an internal spring guide 52 positioned within the adjusting screw 48. Additionally, panel jam nut 46 is provided to retain the valve 10 securely in position within an operation panel, and adjusting screw jam nut 50 is provided to retain the adjusting screw 48 once positioned, to prevent same from loosing its pressure range adjustment in a vibration oriented environment.

The present invention is directed toward a piston mechanism for use with a valve having a movable valve element therein, as in the high-low pressure sensor pilot valve described hereinabove. The piston mechanism comprises a piston housing 60, including an internal piston chamber 62 and a sensing port 63 communicating with the piston chamber, as shown in FIG. 1. A piston means 64 is positioned within the piston chamber 62 and comprises a first piston 66 and a second piston 80 to be described hereinbelow. The first piston 66 includes respective first and second O-ring channels 68 and 70, one of such channels, depending on the orientation of the first piston member within the piston chamber 62, carrying an O-ring 69. The first piston 66 includes a first surface 72 and a second surface 74 opposite therefrom, which first surface is the effective "pressure surface" of the piston means 64 when the piston means is oriented as shown in FIG. 1.

The first piston 66 includes a first internal bore 76 concentric with the outer cylindrical surface thereof, and also includes a second concentric bore 78 terminating in an annular surface 90, which surface engages a mating surface of the second piston 80 as described hereinbelow.

Figure 2:
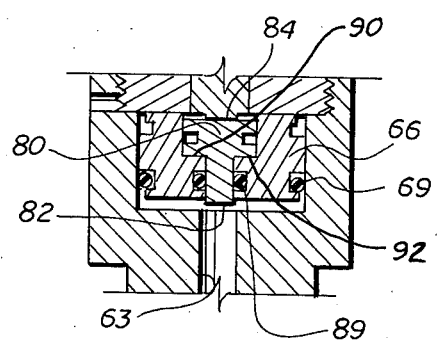
FIG. 2 is a partial vertical sectional view of the present invention shown in a second functional mode.
Figure 3:
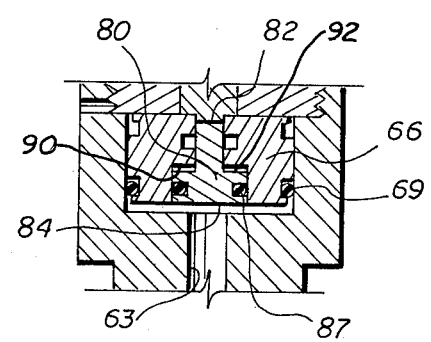
FIG. 3, is a partial vertical sectional view of the present invention shown in a third functional mode.

The second piston 80 includes a first diameter defining a first piston surface 82 and a second diameter defining a second piston surface 84 at the opposite end thereof. These two diameter surfaces define a second piston annular surface 92 for engaging a mating first piston annular surface 90 when the piston means is oriented as shown in FIG. 2 or FIG. 3. The second piston 80 includes an O-ring channel 86 which carries an O-ring 87 when the piston means 64 is oriented as shown in FIG. 3. The first piston 66 also includes a third O-ring channel 88 which carries a third O-ring 89 when the piston means 64 is positioned as shown in FIG. 1 or FIG. 2.

The piston means 64 also includes an optional annular spacer 94 positioned between the mating annular 90 and 92 of respective first and second pistons 66 and 80, for causing the second piston to engage and actuate the valve element 14 in response to sufficient fluid pressure applied to the sensing port 63, as will be described hereinbelow.

Briefly, the operation of the high-low pressure sensor pilot valve is as follows: if the pilot is to act as a high pressure sensor and is to block flow to a controlled valve responsive to the occurence of a high control pressure applied to the sensing port 63, control fluid is piped to the second inlet port 26 and the first inlet port 24 is open to the atmosphere or equivalent. However, when the pilot valve is to act as a low pressure sensor and is to block flow to the controlled valve responsive to the occurence of a low pressure in the sensing port 63, the control fluid is piped to the first inlet port 24 and the second inlet port 26 is open to the atmosphere or equivalent. Thus, the pilot will block flow to the controlled valve while bleeding the pressure from the latter responsive to the occurence of a predetermined high or low pressure depending on the piping to inlet ports 24 and 26.

In the event it is desired to alter the ranges of fluid pressure that will shift the valve element 14 from its first position to its second position against the opposition of spring 38, the piston means 64 may be positioned in one of three orientations within the piston chamber 62 to accomplish the desired changes.

As may be understood from a study of FIG. 2, fluid pressure at sensing port 63 is exposed to the entire surface area of the first piston and the second piston first, or smaller, surface 82. As pressure to port 63 increases, the first piston, having the larger surface area exposed to such fluid pressure, is urged upwardly to engage the bottom end surface of valve body 12. However, a much larger fluid pressure acting upon the second piston smaller surface 82 is required before the second piston 80 will shift upwardly in opposition to the spring 38. Therefore, in this orientation, the effective piston surface area exposed to the sensing port 63 designed to actuate the valve element 14 is the area of the second piston first surface 82.

A second orientation of the piston means 64 within the piston chamber 62 is shown in FIG. 1. The orientation of respective pistons 66 and 80 is the same with respect to their piston surfaces exposed to fluid sensing port 63. In this orientation, however, the piston means 64 includes an optional annular spacer 94 positioned between respective first and second piston mating annular surfaces 90 and 92. The function of this spacer 94 is to cause the second piston 80 to shift upperwardly with the first piston 64 so that, as the first piston shifts upperwardly in response to a lower fluid pressure applied at port 63, the second piston 80 is carried therewith and caused to engage valve element 14 to shift same from its lower position to its upper position against the urging of spring 38. In this orientation, the effective fluid pressure area exposed to the sensing port 63 is that of the first piston 64, a larger piston surface area, requiring a lower fluid pressure to shift the valve element 14 against a set force provided by the spring 38.

A third orientation of the piston means 64 within the piston chamber 62 is shown in FIG. 3, wherein the spacer 94 has been removed and both piston members 66 and 80 are reversed from that of first two orientations described immediately hereinabove. Also in this third orientation, O-ring 69 has been moved from channel 68 to channel 70, O-ring 89 has been removed and new O-ring 87 has been installed in the second piston member second diameter O-ring channel 86 so that the effective fluid pressure area exposed to the sensing port 63 to effect a shift of valve element 14 is that of the second piston second surface 84. In this orientation, as in that of FIG. 2, fluid pressure applied to sensing port 63 will first shift the first piston 66 in an upward direction to engage the lower surface of the valve body 12. Also, as in the orientation shown in FIG. 2, this shifting of the first piston 66 has no effect on the movement of the valve element 14 within the valve body 12. Spring 38 continues to urge the valve element downwardly into engagement with the second piston first surface 82 to hold the second piston 80 in position as shown in FIG. 3. At this point, sufficient fluid pressure at port 63 acts against surface 84 to shift the second piston 80 upwardly to engage and shift valve element 14 to its upper position against the urging of spring 38. In this orientation, the second piston 80 is solely responsible for shifting the valve element 14 upwardly; therefore, the effective fluid pressure area exposed to the sensing port 63 is that of the second piston second surface 84.

The piston mechanism of the present invention is adapted to provide three different ranges of fluid pressure sufficient to shift valve element 14 from its lower position to its upper position in opposition to a single spring having a specific compression range determined by the location of the adjusting screw 48 upon the spring housing 40. It is therefore adapted to be fully functional over a wide range of sensing fluid pressure when used with a single spring, the varying ranges of fluid pressure sufficient to actuate the valve element 14 being dictated by the orientation of the piston means 64 within the piston chamber 62, and hence, the particular effective fluid pressure area thereof exposed to the sensing port 63.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a valve having a body and operable valve element therein, the improvement comprising a device mounted therewith for actuating said valve element, comprising:
    (a) a housing having a piston chamber therein and a sensing port communicating with said chamber, and
    (b) piston means slidable within said chamber and expand to said sensing port for actuating said valve element in response to fluid pressure applied to said sensing port, said piston means comprising:
        (1) a first piston slidable within said chamber and having a concentric bore therethrough, and
        (2) a second piston slidable within said first piston concentric bore for engaging and actuating said valve element,
    wherein said piston means may be positioned within said piston chamber in
        (i) a first orientation wherein the effective fluid pressure, area thereof exposed to said sensing port is the cross-sectional area of said first piston in order to provide a greater net force acting against said valve element to actuate said valve element when sufficient fluid pressure is applied to said sensing port, and
        (ii) a second orientation wherein the effective fluid pressure area thereof exposed to said sensing port is the cross-sectional area of said second piston in order to provide a smaller net force acting against said valve element to actuate said valve element when sufficient fluid pressure is applied to said sensing port.

2. A device for use with a valve having a body and operable valve element therein, said device for actuating said valve element, comprising:
    (a) a housing having a piston chamber therein and a sensing port communicating with said chamber, and
    (b) piston means slidable within said chamber and exposed to said sensing port for actuating said valve element in response to fluid pressure applied to said sensing port, said piston means comprising:
        (1) a first piston slidable within said chamber and having a concentric bore therethrough, and
        (2) a second piston slidable within said first piston concentric bore for engaging and actuating said valve element,
    wherein said piston means may be positioned within said piston chamber in
        (i) a first orientation wherein the effective fluid pressure area thereof exposed to said sensing port is the cross-sectional area of said first piston in order to provide a greater net force acting against said valve element to actuate said valve element when sufficient fluid pressure is applied to said sensing port, and
        (ii) a second orientation wherein the effective fluid pressure area thereof exposed to said sensing port is the cross-sectional area of said second piston in order to provide a smaller net force acting against said valve element to actuate said valve element when sufficient fluid pressure is applied to said sensing port.

3. In a pilot valve comprising:
    (a) a valve body, having:
        (1) an elongated bore therein,
        (2) a fluid inlet port communicating with said bore,
        (3) an outlet port communicating with said bore, and
        (4) a sensing port communicating with said bore;
    (b) a valve element slidable within said bore for regulating the flow of fluid through said pilot valve, said valve element being shiftable between a first position and a second position;
    (c) means for urging said valve element into its first position, the improvement comprising:
    piston means slidable within a piston chamber for shifting said valve element from its first position to its second position, said piston means being exposed to said sensing port so that sufficient fluid pressure applied at said sensing port will cause said piston means to engage said valve element to shift said element from its first position to its second position, against the action of said urging means, said piston means comprising:
    (a) a first piston slidable within said piston chamber and having a concentric bore therethrough, and
    (b) a second piston slidably mounted within said first piston concentric bore for shifting said valve element from its first position to its second position,
    wherein said piston means may be positioned within said elongated bore in
    (a) a first orientation wherein the effective fluid pressure area thereof exposed to said sensing port is the cross-sectional area of said first piston in order to provide a greater net force acting against said valve element to shift said element from its first position to its second position against the action of said urging device when sufficient fluid pressure is applied to said sensing port, and (b) a second orientation wherein the effective fluid pressure area thereof exposed to said sensing port is the cross-sectional area of said second piston in order to provide a smaller net force acting against said valve element to shift said element from its first position to its second position against the action of said urging device when sufficient fluid pressure is applied to said sensing port.

4. A pilot valve as set forth in claim 3, wherein said valve element first position permits communication between said inlet port and said outlet port, and said vlave element second position precludes communication between said inlet port and said outlet port.

5. A pilot valve as set forth in claim 3, wherein said valve element first position precludes communication between said inlet port and said outlet port, and said valve element second position permits communication between said inlet port and said outlet port.

6. A pilot valve comprising:
    (a) a valve body, having:
        (1) an elongated bore therein;
        (2) a fluid inlet port communicating with said bore;
        (3) an outlet port communicating with said bore,
        (4) a piston chamber communicating with said bore, and
        (5) a sensing port communicating with said piston chamber;
    (b) a valve element slidable within said bore for regulating the flow of fluid through said bore, said valve element being shiftable between a first position and a second position;
    (c) means for urging said valve element into its first position; and
    (d) piston means slidably mounted within said piston chamber for shifting said valve element from its first to its second position, said piston means being exposed to said sensing port so that sufficient fluid pressure applied at said sensing port will cause said piston means to engage said valve element to shift said element from its first to its second position against the action of said urging means when sufficient fluid pressure is applied to said sensing port, said piston means comprising:
        (1) a first piston slidably mounted within said piston chamber, and having a concentric bore therethrough, and
        (2) a second piston slidably mounted within said first piston bore for shifting said valve element, wherein said piston means may be positioned within said piston chamber in
    (i) a first orientation wherein the effective fluid pressure area thereof exposed to said sensing port is the cross-sectional area of said first piston in order to provide a greater net force acting against said valve element to shift said element from its first position to its second position against the action of said urging means, when sufficient fluid pressure is applied to said sensing port, and
    (ii) a second orientation wherein the effective fluid pressure area thereof exposed to said sensing port is the cross-sectional area of said second piston in order to provide a smaller net force acting against said valve element to shift said element from its first position to its second position against the action of said urging means, when sufficient fluid pressure is applied to said sensing port.

7. A pilot valve as set forth in claim 6, wherein said valve element first position permits communication between said inlet port and said outlet port, and said valve element second position precludes communication between said inlet port and said outlet port.

8. A pilot valve as set forth in claim 6, wherein said valve element first position precludes communication between said inlet port and said outlet port, and said valve element second position permits communication between said inlet port and said outlet port.

9. In a pilot valve comprising:
    (a) a valve body, having:
        (1) an elongated bore therein,
        (2) a first fluid inlet port communicating with said bore,
        (3) a second fluid inlet port communicating with said bore,
        (4) an outlet port communicating with said bore, and
        (5) a sensing port communicating with said bore;
    (b) a valve element slidable within said bore for regulating the flow of fluid through said pilot valve, said valve element being shiftable between
        (1) a first position permitting communication between said first inlet port and said outlet port and precluding communication between said second inlet port and said outlet port; and
        (2) a second position permitting communication between said second inlet port and said outlet port and precluding communication between said first inlet port and said outlet port;
    (c) means for urging said valve element into its first position, the improvement comprising:
    a piston means slidable within a piston chamber for shifting said valve element from its first position to its second position, said piston means being exposed to said sensing port so that sufficient fluid pressure applied at said sensing port will cause said piston means to engage said valve element to shift said element from its first position to its second position, against the action of said urging means, said piston means comprising:
    (a) a first piston slidable within said piston chamber, and having a concentric bore therethrough, and
    (b) a second piston slidably mounted with said first piston concentric bore for shifting said valve element from its first position to its second position, wherein said piston means may be positioned within said piston chamber in
    (a) a first orientation wherein the effective fluid pressure area thereof exposed to said sensing port is the cross-sectional area of said first piston in order to provide a greater net force acting against said valve element to shift said element from its first position to its second position against the action of said urging device when sufficient fluid pressure is applied to said sensing port, and
    (b) a second orientation wherein the effective fluid pressure area thereof exposed to said sensing port is the cross-sectional area of said second piston in order to provide a smaller net force acting against said valve element to shift said element from its first position to its second position against the action of said urging device.

10. A pilot valve comprising:
    (a) a valve body, having (1) an elongated bore therein,
(2) a first fluid inlet port communicating with said bore,
(3) a second fluid inlet port communicating with said bore,
(4) an outlet port communicating with said bore,
(5) a piston chamber communicating with said bore, and
(6) a sensing port communicating with said piston chamber;

(b) a valve element slidable within said bore for regulating the flow of fluid through said pilot valve, said valve element being shiftable between
(1) a first position permitting communication between said first inlet port and said outlet port and precluding communication between said second inlet port and said outlet port; and
(2) a second position permitting communication between said second inlet port and said outlet port and precluding communication between said first inlet port and said outlet port;

(c) means for urging said valve element into its first position; and (d) piston means slidably mounted within said piston chamber for shifting said valve element from its first position to its second position, said piston means being exposed to said sensing port so that sufficient fluid pressure applied at said sensing port will cause said piston means to engage said valve element to shift said element from its first position to its second position, against the action of said urging means, said piston means comprising:
(1) a first piston slidably mounted within said piston chamber, and having a concentric bore therethrough, and
(2) a second piston slidably mounted within said first piston concentric bore for shifting said valve element from its first position to its second position, wherein said piston means may be positioned within said piston chamber in (i) a first orientation wherein the effective fluid pressure area thereof exposed to said sensing port is the cross-sectional area of said first piston in order to provide a greater net force acting against said valve element to shift said element from its first position to its second position against the action of said urging device when sufficient fluid pressure is applied to said sensing port, and (ii) a second orientation wherein the effective fluid pressure area thereof exposed to said sensing port is the cross-sectional area of said second piston in order to provide a smaller net force acting against said valve element to shift said element from its first position to its second position against the action of said urging device.

11. The valve as set forth in claims 1, 2, 3, 4, 5, 6, 7, 8, 9, or 10, wherein said second piston includes a second concentric cylindrical surface defining a second piston surface in order that said piston means may be positioned within said piston chamber in a third orientation wherein the effective fluid pressure area exposed to said sensing port is the cross-sectional area thereof of said second piston surface in order to provide a third net force acting against said valve element to shift said element from its first position to its second position against the action of said urging device when sufficient fluid pressure is applied to said sensing port.

12. The device as set forth in claims 1, 2, 3, 4, 5, 6, 7, 8, 9, or 10, including a spacer mounted with said first and second pistons when said piston means is in its first orientation to cause said second piston to actuate said valve element when sufficient fluid pressure is applied to said sensing port.

* * * * *